US008194561B2

(12) United States Patent
Kogata et al.

(10) Patent No.: US 8,194,561 B2
(45) Date of Patent: Jun. 5, 2012

(54) PACKET RELAY DEVICE AND METHOD FOR TRANSFERRING PACKET THEREIN

(75) Inventors: Hiroyuki Kogata, Osaka (JP); Akio Shinohara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 317 days.

(21) Appl. No.: 12/559,277

(22) Filed: Sep. 14, 2009

(65) Prior Publication Data
US 2010/0002703 A1 Jan. 7, 2010

Related U.S. Application Data

(63) Continuation of application No. PCT/JP2007/055651, filed on Mar. 20, 2007.

(51) Int. Cl.
*H04L 12/54* (2006.01)
(52) U.S. Cl. ......... 370/252; 370/392; 370/401; 370/428
(58) Field of Classification Search .................. None
See application file for complete search history.

(56) References Cited

U.S. PATENT DOCUMENTS

| 5,477,547 A | 12/1995 | Sugiyama | |
|---|---|---|---|
| 2003/0189932 A1* | 10/2003 | Ishikawa et al. | 370/392 |
| 2004/0120269 A1* | 6/2004 | Sumino et al. | 370/255 |
| 2007/0053296 A1* | 3/2007 | Yazaki et al. | 370/235 |
| 2007/0097968 A1* | 5/2007 | Du | 370/389 |
| 2007/0147383 A1* | 6/2007 | Kojima | 370/392 |
| 2008/0075117 A1 | 3/2008 | Tanaka | |
| 2010/0128729 A1* | 5/2010 | Yazaki et al. | 370/392 |

FOREIGN PATENT DOCUMENTS

| JP | 795231 | 4/1995 |
|---|---|---|
| JP | 2004193821 | 7/2004 |
| JP | 2006094094 | 4/2006 |
| JP | 200879056 | 4/2008 |

OTHER PUBLICATIONS

Notification of Reason for Refusal Office Action dated Apr. 12, 2011, in corresponding Japanese Patent Application No. 2009-505007.
International Search Report dated Jun. 19, 2007.

* cited by examiner

*Primary Examiner* — Robert Scheibel
*Assistant Examiner* — Duc Duong
(74) *Attorney, Agent, or Firm* — Murphy & King, P.C.

(57) ABSTRACT

A packet relay device receives an input packet via a first communication port out of a plurality of communication ports of the packet relay device and transmits the input packet via a second communication port out of the plurality of communication ports. The packet relay device includes a learning table storage, a header adder, a discard determiner, and a packet reducer. The learning table storage stores a source address contained in the input packet, in association with an input port identifier capable of identifying the first communication port. The header adder adds an internal transfer header containing the input port identifier to the input packet to generate an internal transfer packet. The discard determiner determines whether to discard the internal transfer packet. The packet reducer reduces the internal transfer packet to preserve at least the source address and the input port identifier upon determining to discard the internal transfer packet.

9 Claims, 11 Drawing Sheets

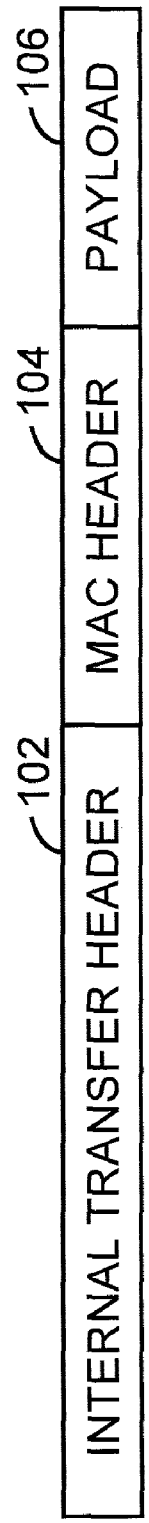
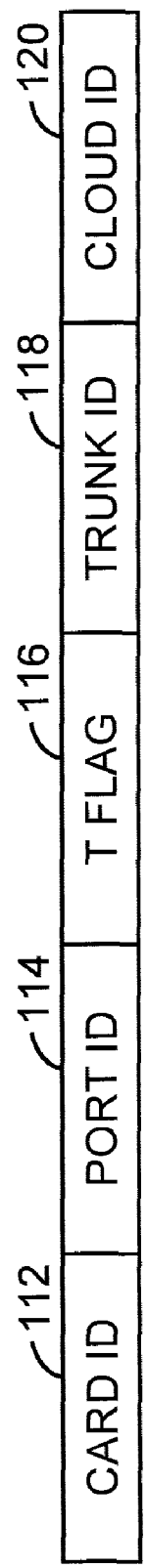
FIG. 8
FIG. 9

PACKET RELAY DEVICE AND METHOD FOR TRANSFERRING PACKET THEREIN

CROSS-REFERENCE TO RELATED APPLICATION

This is a continuation of Application PCT/JP2007/055651, filed on Mar. 20, 2007, the entire contents of which are incorporated herein by reference.

FIELD

The embodiments discussed herein are related to a packet relay device, and in particular, to a method for transferring a packet within the packet relay device.

BACKGROUND

A packet relay device is equipped with a plurality of communication ports. Each communication port may serve as an input port as well as an output port. A packet is received via one communication port, transferred in the packet relay device, and transmitted via another communication port. There is a packet relay device that stores a terminal address of a terminal connected to each communication port and selectively transmits a packet via an output port corresponding to a destination address contained in an input packet (for example, see Japanese Laid-open Patent Publication No. 7-95231). Therefore, the packet relay device stores a source address of the input packet in a learning table in association with an input port identifier (ID) that is capable of identifying the input port. This process is referred to as a learning process. There are variations in when to perform the learning process and how to keep the learning table depending on the design of the packet relay device. The variations include: learning right after reception of a packet, learning right before transmission of a packet, learning at the mid-period from reception to transmission of a packet, keeping the learning table for every communication port, sharing the learning table by all of the communication ports, shearing the learning table by a part of the communication ports, and the like.

There is an input packet that is not transmitted via a specified output port and is discarded on the way. Such a packet is referred to as a discard packet. For example, normally, a packet received via a certain communication port is not transmitted via the same communication port. Accordingly, the packet is discarded. However, the learning process on the packet is performed. Accordingly, even a discard packet is transferred to a place in the packet relay device, where the learning process is performed. Thus, the traffic in the packet relay device is increased by the transfer, and the resource of the packet relay device is uselessly used.

SUMMARY

According to an aspect of the present invention, provided is a packet relay device for receiving an input packet via a first communication port out of a plurality of communication ports of the packet relay device and transmitting the input packet via a second communication port out of the plurality of communication ports. The packet relay device includes a learning table storage, a header adder, a discard determiner, and a packet reducer.

The learning table storage stores a source address contained in the input packet, in association with an input port identifier capable of identifying the first communication port.

The header adder adds an internal transfer header containing the input port identifier to the input packet to generate an internal transfer packet.

The discard determiner determines whether to discard the internal transfer packet.

The packet reducer reduces the internal transfer packet to preserve at least the source address and the input port identifier upon determining to discard the internal transfer packet.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a diagram illustrating an example of a data structure of an internal transfer packet according to a first embodiment of the present invention;

FIG. 9 is a diagram illustrating an example of a record structure of a port group table according to a first embodiment of the present invention;

DESCRIPTION OF EMBODIMENTS

It is preferable to provide a method for transferring a discard packet in a packet relay device, which makes it possible to control traffic increase caused by transferring the discard packet.

According to the embodiments, a method for transferring a discard packet in a packet relay device, which makes it possible to control traffic increase caused by transferring the discard packet, may be provided since the data of the discard packet may be reduced.

Hereinafter, embodiments of the present invention will be discussed with reference to the drawings.

First Embodiment

Figure 1:
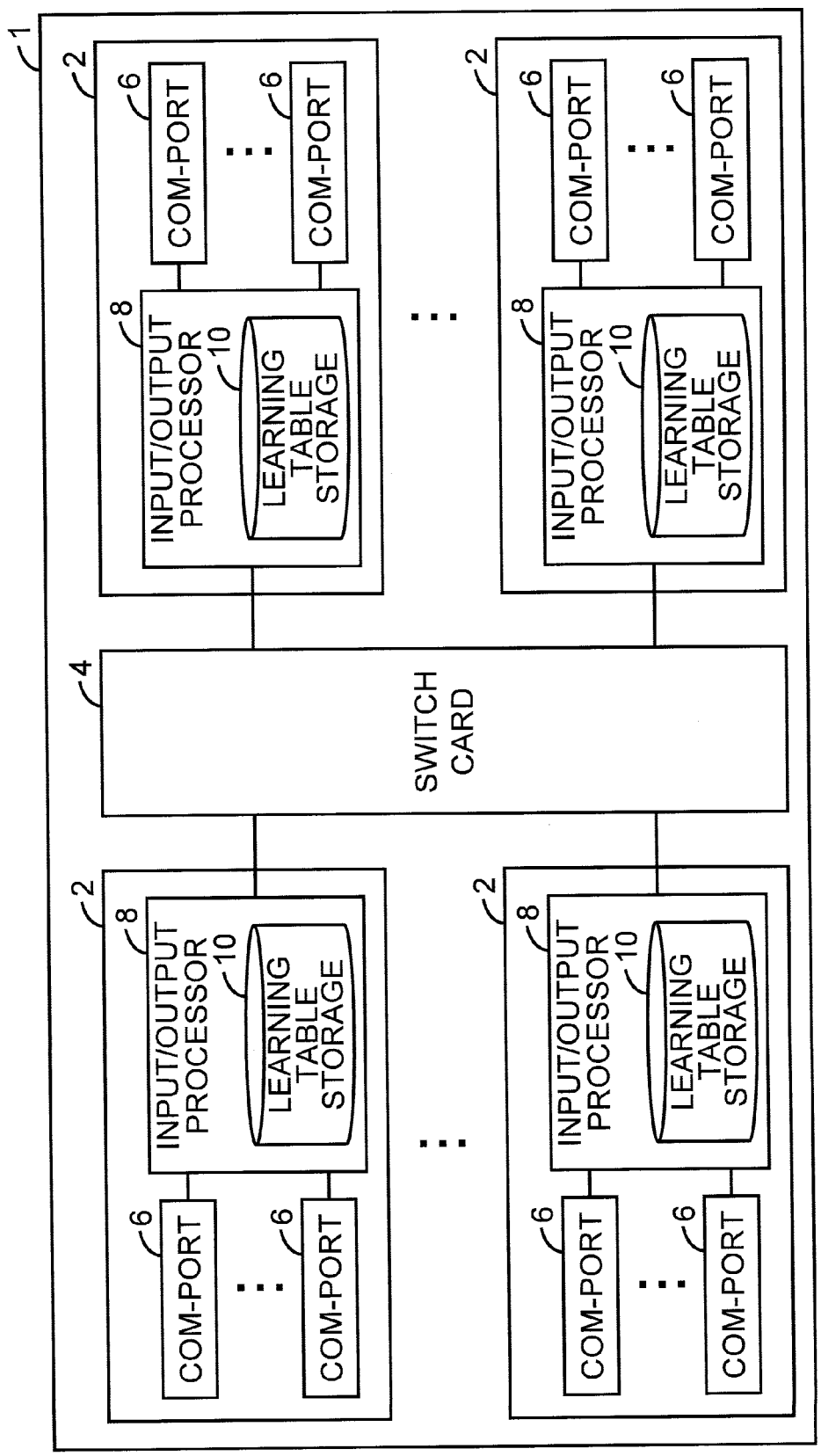
FIG. 1 is a diagram illustrating an example of a system configuration of a packet relay device according to a first embodiment of the present invention.

FIG. 1 is a diagram illustrating an example of a system configuration of a packet relay device according to a first embodiment of the present invention. The packet relay device 1 illustrated in the example of FIG. 1 includes a plurality of line cards 2 and a switch card 4. Each line card 2 includes a plurality of communication ports (denoted by "COM-PORT" in the drawings) 6 and an input/output processor 8 for performing an input/output process and a learning process on a packet that is received and transmitted via the communication ports 6. Accordingly, in the first embodiment, a card ID that is capable of identifying a line card 2 and a port ID that is capable of identifying a communication port 6 within a line card 2 shall be used a for uniquely identifying a communication port 6.

Figure 2:
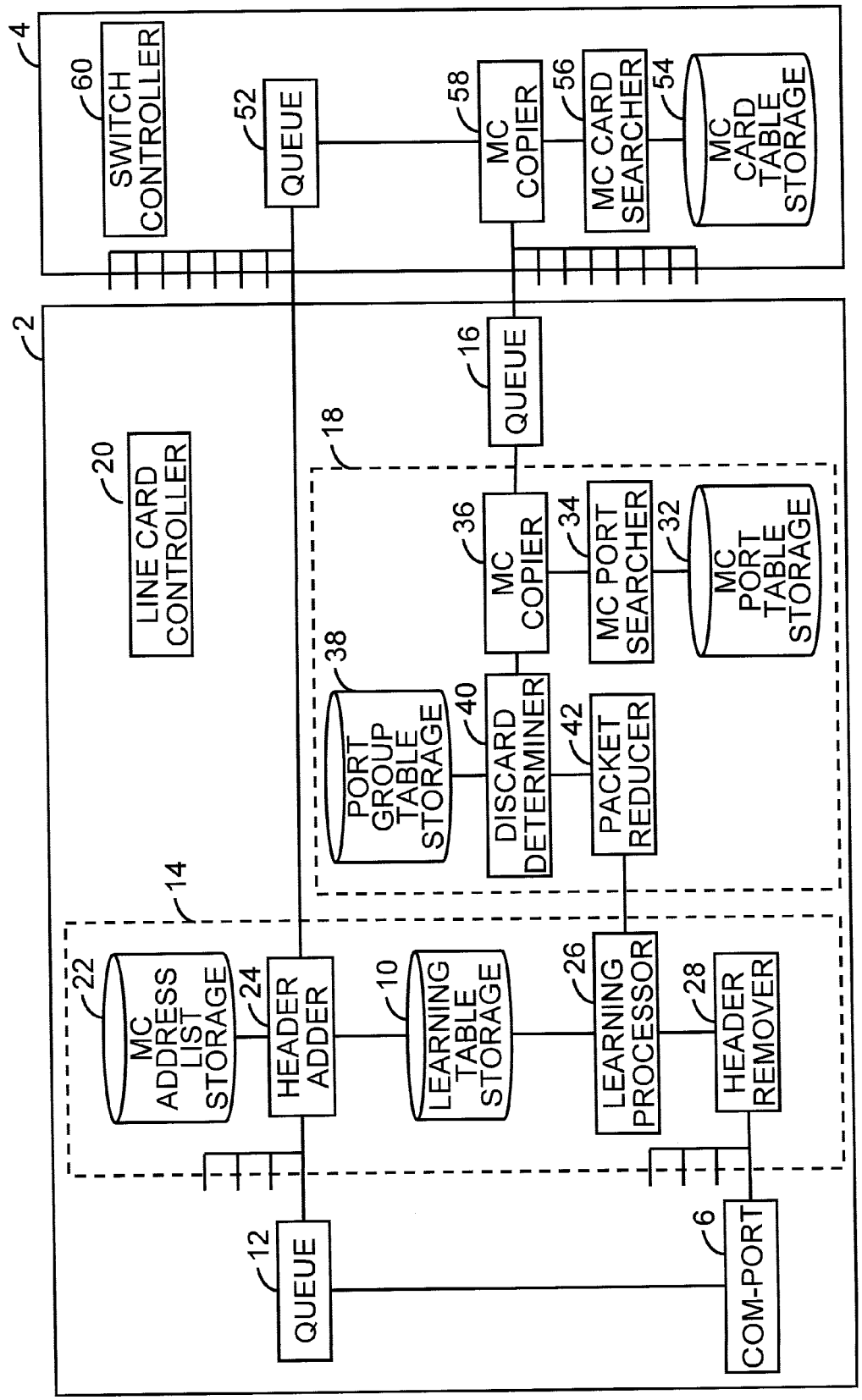
FIG. 2 is a diagram illustrating an example of a detailed configuration of a packet relay device according to a first embodiment of the present invention.

FIG. 2 is a diagram illustrating an example of a detailed configuration of a packet relay device according to a first embodiment of the present invention.

The line card 2 of the packet relay device 1 according to the first embodiment includes the communication port 6, a queue 12, a header processor 14, a queue 16, a multicast copier 18, and a line card controller 20. The communication port 6 receives and transmits a packet.

The queue 12 temporarily stores an input packet.

The header processor 14 adds/removes an internal transfer header to/from a packet and performs a learning process for a source address.

The queue 16 temporarily stores the internal transfer packet including the internal transfer header.

The multicast copier 18 copies a multicast packet for each communication port.

The line card controller 20 controls the entire line card 2.

The communication port 6 receives an input packet and transfers the input packet to the queue 12. Further, the communication port 6 transmits an output packet transferred from the header processor 14.

The queue 12 stores the input packet transferred from the communication port 6 and transfers the input packet to the header processor 14 in a first-in first-out manner.

The header processor 14 adds an internal transfer header to the input packet transferred from the queue 12 to generate an internal transfer packet, and transfers the internal transfer packet to the switch card 4. The header processor 14 learns a source address contained in an internal transfer packet transferred from the multicast copier 18. Further, the header processor 14 removes an internal transfer header from the internal transfer packet to generate an output packet, and transfers the output packet to the communication port 6.

The queue 16 temporally stores an internal transfer packet transferred from the switch card 4, and transfers the internal transfer packet to the multicast copier 18 in a first-in first-out manner.

When the internal transfer packet transferred from the queue 16 is a multicast packet, the multicast copier 18 identifies output ports, copies the internal transfer packet for the identified output ports, and writes an output port ID in the internal transfer header of each of the copied internal transfer packet to transfer the copied internal transfer packets to the header processor 14. Further, the multicast copier 18 determines whether the internal transfer packet is to be discarded. Upon determining that the internal transfer packet is to be discarded, the multicast copier 18 performs a packet reduction process on the internal transfer packet so as to preserve data required for learning the source address.

The line card controller 20 controls the entire line card 2. It is assumed that all of the functions, which is not processed by the above-discussed each processing unit, among the functions performed by the line card 2 may be processed by the line card controller 20.

The header processor 14 includes an MC address list storage 22, a header adder 24, a learning processor 26, a learning table storage 10, and a header remover 28.

The MC address list storage 22 stores a destination address of a multicast packet.

The header adder 24 adds an internal transfer header to the input packet.

The learning processor 26 learns a source address contained in the internal transfer packet.

The learning table storage 10 stores a learned source address.

The header remover 28 removes the internal transfer header from the internal transfer packet to generate an output packet.

The MC address list storage 22 stores a list of destination addresses of a multicast packet.

The header adder 24 adds an internal transfer header to the input packet transferred from the queue 12 to generate an internal transfer packet, and transfers the internal transfer packet to the switch card 4. When the destination address contained in the input packet does not match the addresses stored in the MC address list storage 22, the header adder 24 searches an output card ID and an output port ID from the learning table storage 10 in accordance with the destination address contained in the input packet, and writes the output card ID and the output port ID in the internal transfer header.

The learning processor 26 learns a source address contained in the internal transfer packet transferred from the multicast copier 18, and stores the learned source address in the learning table storage 10.

The learning table storage 10 stores the source address learned by the learning processor 26.

The header remover 28 removes the internal transfer header from the internal transfer packet to generate an output packet, and transfers the output packet to the communication port 6.

The multicast copier 18 includes an MC port table storage 32, an MC port searcher 34, an MC copier 36, a port group table storage 38, a discard determiner 40, and a packet reducer 42.

The MC port table storage 32 stores data on output ports of a multicast packet.

The MC port searcher 34 searches the output ports of the multicast packet.

The MC copier 36 rewrites the internal transfer header of the multicast packet for every output port.

The port group table storage 38 stores group data of communication ports.

The discard determiner 40 determines whether the internal transfer packet is to be discarded.

The packet reducer 42 performs a packet reduction process on the internal transfer packet.

The MC port table storage 32 stores output port IDs corresponding to the destination addresses of the multicast packet.

The MC port searcher 34 searches the output port ID from the MC port table storage 32 in accordance with the destination address contained in the internal transfer packet, and outputs the output port ID to the MC copier 36.

The MC copier 36 copies the internal transfer packet for the output port IDs found by the MC port searcher 34 when the internal transfer packet is a multicast packet, writes each output port ID in each internal transfer header, and transfers the copied internal transfer packets to the discard determiner 40.

The port group table storage 38 stores group data of the communication ports.

The discard determiner 40 determines whether the internal transfer packet is to be discarded. The internal transfer packet which is determined to be discarded is referred to as a discard packet.

When it is determined that the internal transfer packet is a discard packet, the packet reducer 42 performs a packet reduction process on the internal transfer packet so as to preserve data required for learning the source address, and transfers the internal transfer packet to the header processor 14.

The switch card 4 of the packet relay device 1 according to the first embodiment of the present invention includes a queue 52, an MC card table storage 54, an MC card searcher 56, an MC copier 58, and a switch controller 60.

The queue 52 temporarily stores an internal transfer packet.

The MC card table storage 54 stores the output card IDs of the multicast packet.

The MC card searcher 56 searches the output card IDs of the multicast packet.

The MC copier 58 rewrites the internal transfer header of the multicast packet for every output card.

The switch controller 60 controls the entire switch card 4.

The queue 52 temporarily stores the internal transfer packet transferred from the line card 2, and transfers the internal transfer packet to the MC copier 58 in a first-in first-out manner.

The MC card table storage 54 stores the output card IDs corresponding to the destination addresses of the multicast packet.

The MC card searcher 56 searches the output card ID from the MC card table storage 54 in accordance with the destination address contained in the copied internal transfer packet, and outputs the output card ID to the MC copier 58.

The MC copier 58 copies the internal transfer packet for each output card ID found by the MC card searcher 56 when the internal transfer packet is a multicast packet, writes each output card ID in each internal transfer header, and transfers the copied internal transfer packets to the corresponding line card 2 in accordance with the output card ID contained in the internal transfer header.

The switch controller 60 controls the entire switch card 4. It is assumed that all of the functions, which is not processed by the above-discussed each processing unit, among the functions performed by the switch card 4 may be processed by the switch controller 60.

Operations of the packet relay device 1 will be discussed.

Figure 3:
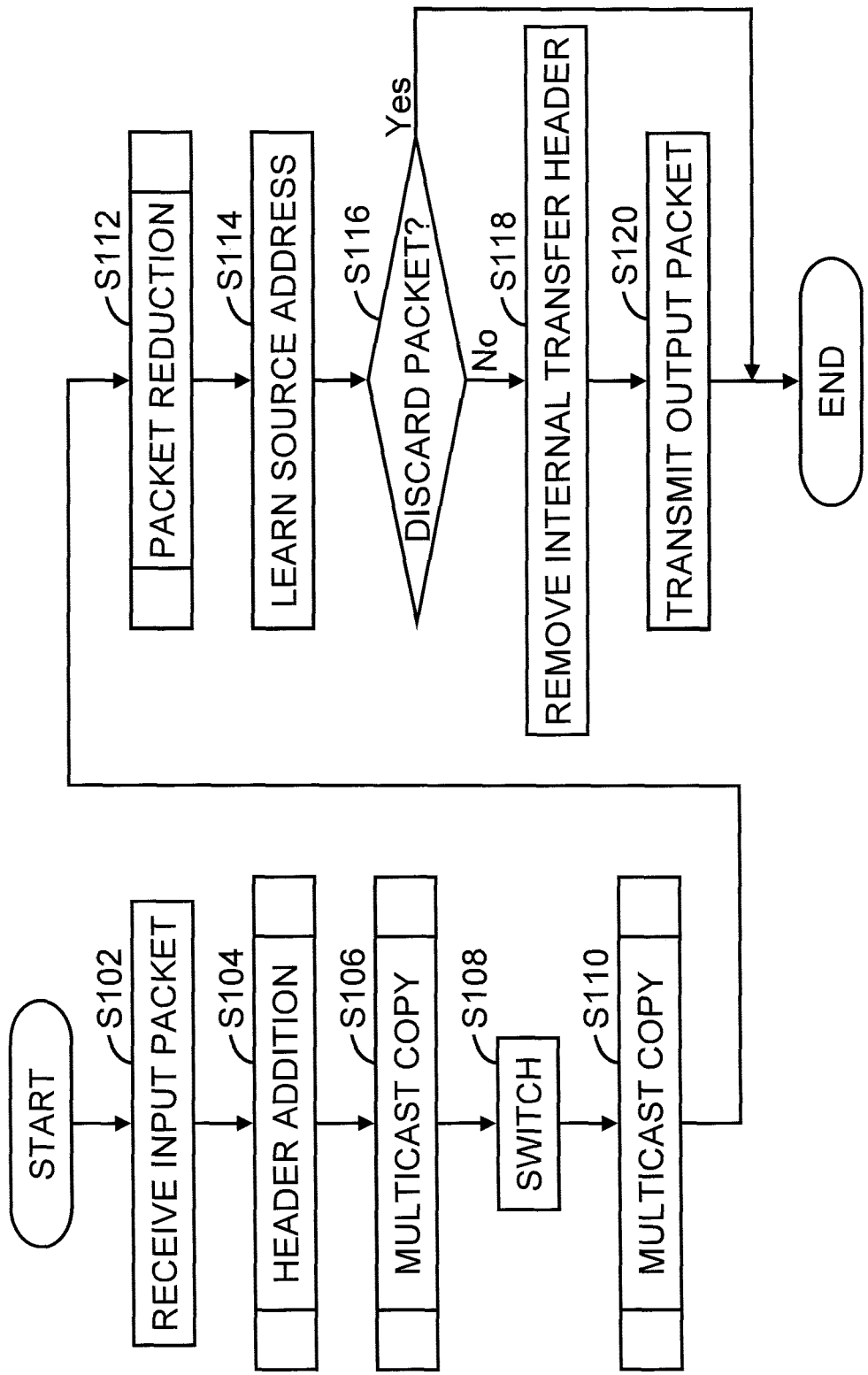
FIG. 3 is a flow chart illustrating an example of an operation flow of a packet relay device according to a first embodiment of the present invention.

FIG. 3 is a flow chart illustrating an example of an operation flow of a packet relay device according to a first embodiment of the present invention. An operation flow of the packet relay device 1 according to the first embodiment will be discussed in the order of operation S102 to operation S120 illustrated in FIG. 3.

In operation S102, the communication port 6 receives an input packet and stores the input packet in the queue 12.

In operation S104, the header adder 24 adds an internal transfer header to the input packet stored in the queue 12 to generate an internal transfer packet, and transfers the internal transfer packet to the switch card 4. The transferred internal transfer packet is stored in the queue 52. The detail of the header addition process will be discussed later.

In operation S106, when the internal transfer packet is a multicast packet or a broadcast packet, the MC copier 58 of the switch card 4 performs a multicast copy. The detail of the multicast copy process will be discussed later.

In operation S108, the internal transfer packet is transferred to the line card 2 of an output destination, and stored in the queue 16.

In operation S110, when the internal transfer packet is a multicast packet or a broadcast packet, the MC copier 36 of the line card 2 performs a multicast copy. The detail of the multicast copy process will be discussed later.

In operation S112, when the internal transfer packet is a discard packet, the packet reducer 42 performs the packet reduction process on the internal transfer packet. The detail of the packet reduction process will be discussed later.

In operation S114, the learning processor 26 performs the learning process in accordance with the source address, the output card ID, and the output port ID contained in the internal transfer header.

In operation S116, the header remover 28 determines whether the internal transfer packet is a discard packet. When the internal transfer packet is a discard packet ("Yes" in operation S116), the internal transfer packet is discarded.

In operation S118, when the internal transfer packet is not a discard packet ("No" in operation S116), the header remover 28 removes the internal transfer header from the internal transfer packet to generate an output packet, and transfers the output packet to the output port.

In operation S120, the output packet is transmitted via the output port.

Figure 4:
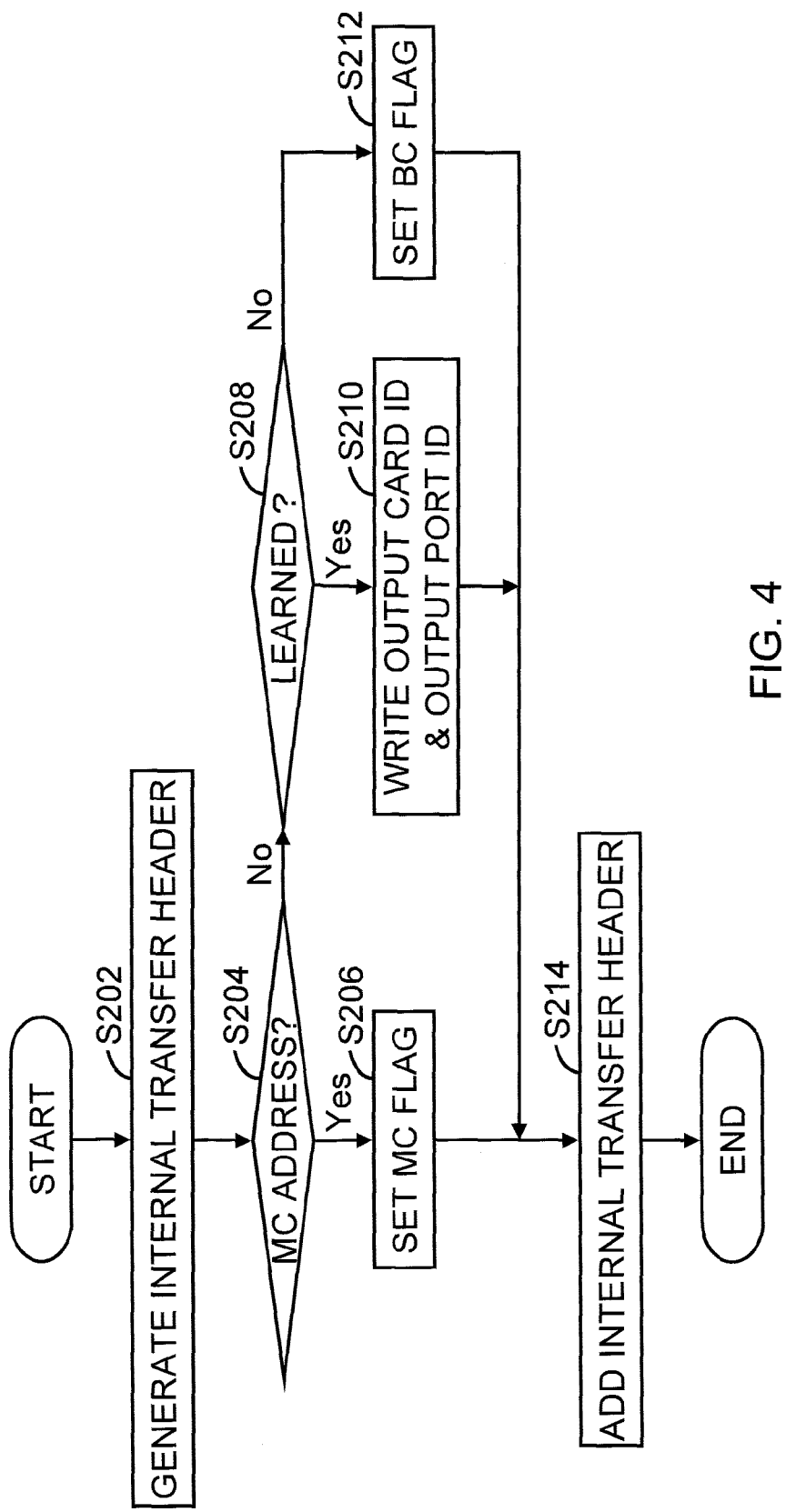
FIG. 4 is a flow chart illustrating an example of an operation flow of a header addition process according to a first embodiment of the present invention.

FIG. 4 is a flow chart illustrating an example of an operation flow of a header addition process according to a first embodiment of the present invention. The operation flow of the header addition process according to the first embodiment of the present invention will be discussed in the order of operation S202 to operation S214 illustrated in FIG. 4.

In operation S202, the header adder 24 extracts the source address and the destination address from the header of the input packet and writes the source address and the destination address in the internal transfer header. The internal transfer header includes at least the input card ID and input port ID. In the first embodiment, it is assumed that the internal transfer header further includes the source address and the destination address.

In operation S204, the header adder 24 checks whether the destination address is stored in the MC address list storage 22.

In operation S206, when the destination address is stored in the MC address list storage 22 ("Yes" in operation S204), the header adder 24 sets an MC flag contained in the internal transfer header. The MC flag is capable of indicating that the internal transfer packet is a multicast packet.

In operation S208, when the destination address is not stored in the MC address list storage 22 ("No" in operation S204), the header adder 24 searches the output card ID and the output port ID from the learning table storage 10 in accordance with the destination address.

In operation S210, when the output card ID and the output port ID have been extracted from the learning table storage 10 ("Yes" in operation S208), the header adder 24 writes the output card ID and the output port ID in the internal transfer header.

In operation S212, when the output card ID and the output port ID have not been extracted from the learning table storage 10, that is, when the destination address is not learned ("No" in operation S208), the header adder 24 sets a BC flag contained in the internal transfer header. The BC flag is capable of indicating that the internal transfer packet is a broadcast packet.

In operation S214, the header adder 24 adds the internal transfer header to the input packet to generate an internal transfer packet.

Figure 5:
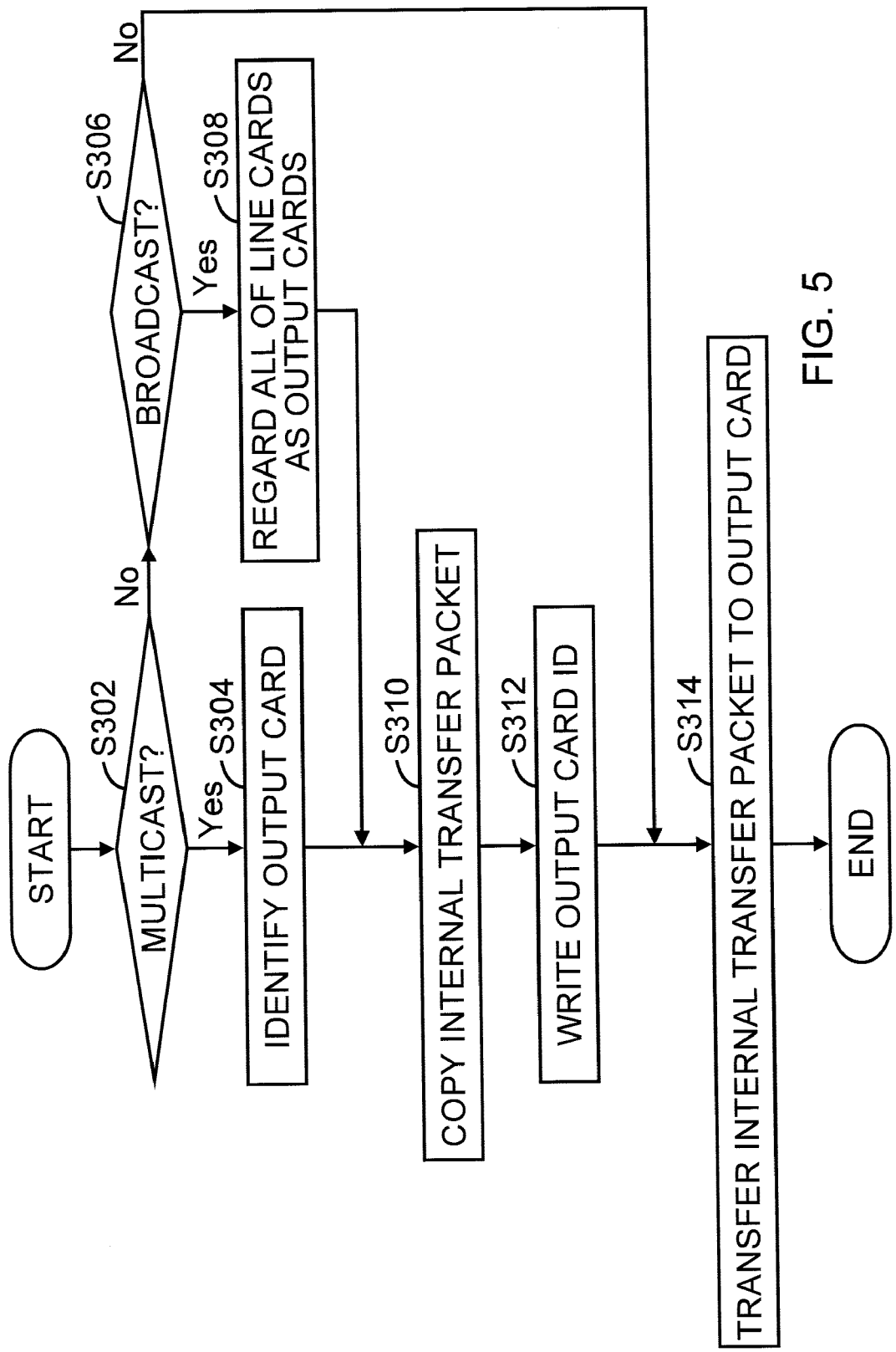
FIG. 5 is a flow chart illustrating an example of an operation flow of a multicast copy process executed by a switch card according to a first embodiment of the present invention.

FIG. 5 is a flow chart illustrating an example of an operation flow of a multicast copy process executed by a switch card according to a first embodiment of the present invention. The operation flow of the multicast copy process executed by the switch card 4 according to the first embodiment of the present invention will be discussed in the order of operation S302 to operation S314 illustrated in FIG. 5.

In operation S302, the MC copier 58 determines whether the internal transfer packet is a multicast packet in accordance with the MC flag contained in the internal transfer header.

In operation S304, when the internal transfer packet is a multicast packet ("Yes" in operation S302), the MC card searcher 56 searches the output card ID from the MC card table storage 54 in accordance with the destination address and outputs the found output card ID to the MC copier 58.

In operation S306, when the internal transfer packet is not a multicast packet ("No" in operation S302), the MC copier 58 determines whether the internal transfer packet is a broadcast packet in accordance with the BC flag contained in the internal transfer header. When the internal transfer packet is not a broadcast packet ("No" in operation S306), the process proceeds to operation S314.

In operation S308, when the internal transfer packet is a broadcast packet ("Yes" in operation S306), the MC copier 58 regards all of the line cards 2 mounted in the packet relay device 1 as output cards.

In operation S310, the MC copier 58 copies the internal transfer packet for each of the output cards.

In operation S312, the MC copier 58 writes the corresponding output card ID in each internal transfer header of the copied internal transfer packets.

In operation S314, the MC copier 58 transfers each of the copied internal transfer packets to the corresponding output card.

Figure 6:
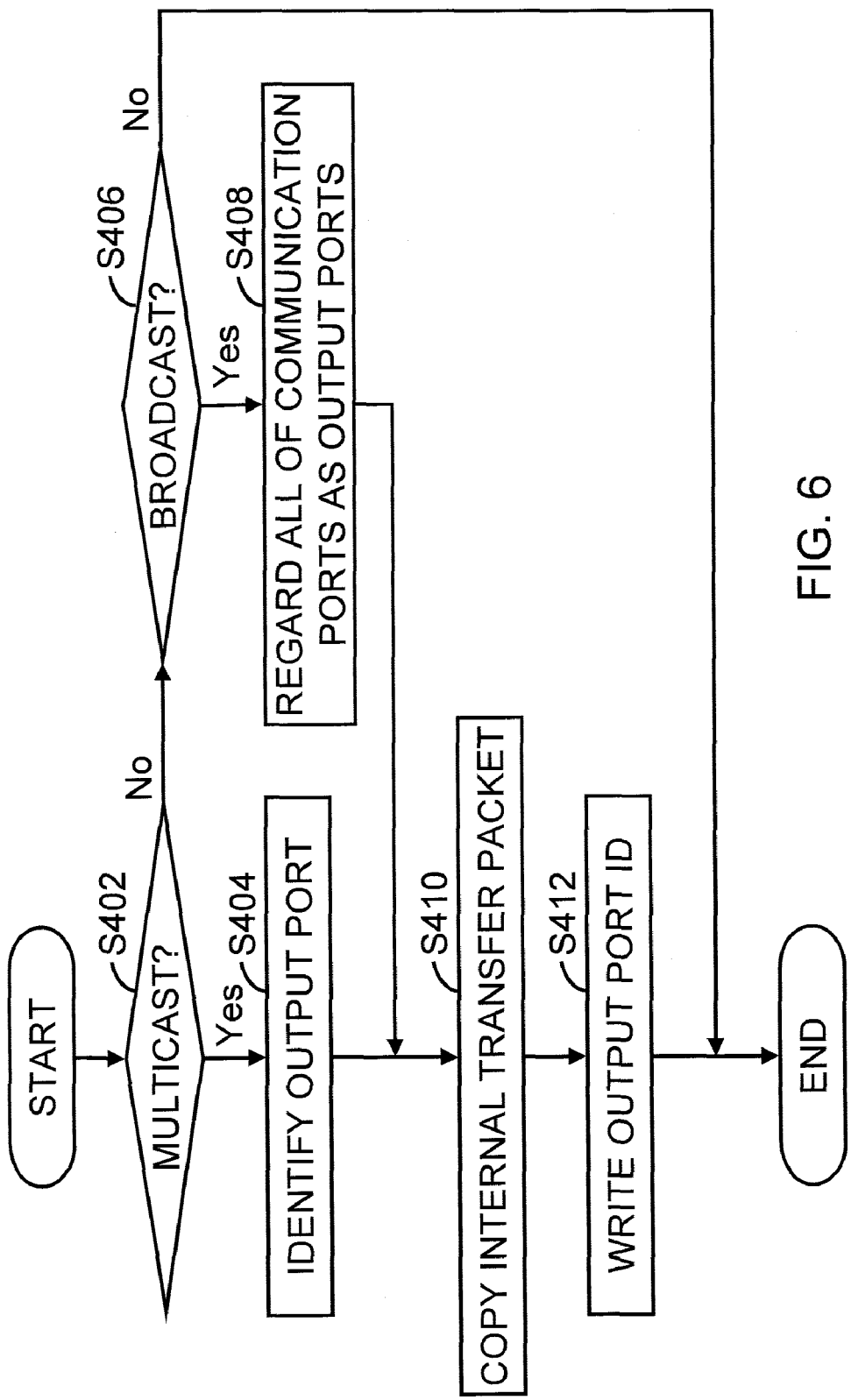
FIG. 6 is a flow chart illustrating an example of an operation flow of a multicast copy process executed by a line card according to a first embodiment of the present invention.

FIG. 6 is a flow chart illustrating an example of an operation flow of a multicast copy process executed by a line card according to a first embodiment of the present invention. The operation flow of the multicast copy process executed by the line card 2 according to the first embodiment of the present invention will be discussed in the order of operation S402 to operation S412 illustrated in FIG. 6.

In operation S402, the MC copier 36 determines whether the internal transfer packet is a multicast packet in accordance with the MC flag contained in the internal transfer header.

In operation S404, when the internal transfer packet is a multicast packet ("Yes" in operation S402), the MC port searcher 34 searches the output port ID from the MC port table storage 32 in accordance with the destination address and outputs the found output port ID to the MC copier 36.

In operation S406, when the internal transfer packet is not a multicast packet ("No" in operation S402), the MC copier 36 determines whether the internal transfer packet is a broadcast packet in accordance with the BC flag contained in the internal transfer header. When the internal transfer packet is not a broadcast packet ("No" in operation S406), the MC copier 36 terminates the process.

In operation S408, when the internal transfer packet is a broadcast packet ("Yes" in operation S406), the MC copier 36 regards all of the communication ports 6 of the line card 2 as output ports.

In operation S410, the MC copier 36 copies the internal transfer packet for each of the output ports.

In operation S412, the MC copier 36 writes the corresponding output port ID in each internal transfer header of the copied internal transfer packets.

Figure 7:
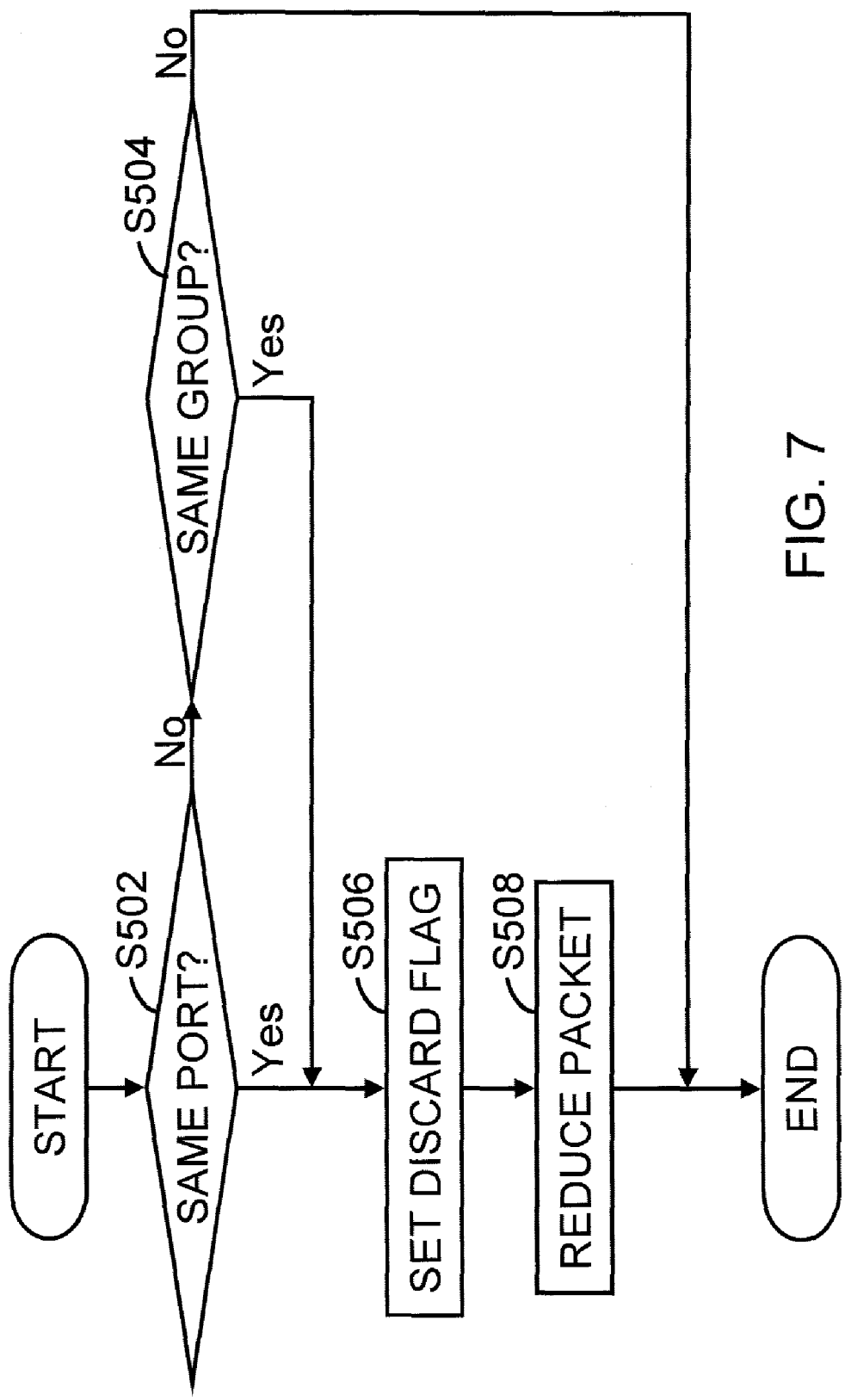
FIG. 7 is a flow chart illustrating an example of an operation flow of a packet reduction process according to a first embodiment of the present invention.

FIG. 7 is a flow chart illustrating an example of an operation flow of a packet reduction process according to a first embodiment of the present invention. The operation flow of the packet reduction process of the first embodiment of the present invention will be discussed in the order of operation S502 to operation S508 illustrated in FIG. 7.

In operation S502, the discard determiner 40 compares the output card ID and output port ID with the input card ID and input port ID, respectively, in accordance with the data contained in the internal transfer header to determine whether the input port and the output port are the same port.

In operation S504, when the card IDs or the port IDs are not matched, that is, when the input port and the output port are not the same port ("No" in operation S502), the discard determiner 40 determines whether the input port and the output port belong to the same port group in accordance with the data stored in the port group table storage 38. When the input port and the output port do not belong to the same port group ("No" in operation S504), the discard determiner 40 determines that the internal transfer packet is not to be discarded and terminates the process.

In operation S506, when the card IDs and the port IDs are matched, that is, when the input port and the output port are the same port ("Yes" in operation S502), or when the input port and the output port belong to the same port group ("Yes" in operation S504), the discard determiner 40 determines that the internal transfer packet is to be discarded and sets the discard flag contained in the internal transfer header.

In operation S508, the packet reducer 42 checks the discard flag contained in the internal transfer header, and performs the packet reduction process on the internal transfer packet when the discard flag is set. Any packet reduction process on the packet may be employed as far as at least the data required for learning the source address is preserved in the internal transfer packet after the packet reduction process. In the first embodiment, it is assumed that the source address, input card ID, and input port ID are preserved.

Conventionally, a discard packet is transferred with the original data amount to the header processor 14 where the learning process is performed. With the configuration discussed above, a discard packet may be performed the packet reduction process by the multicast copier 18 to be transferred to the header processor 14, and then, the learning process is performed. Accordingly, the traffic increase due to transfer of the discard packet in the packet relay device may be controlled.

Hereinafter, a concrete example will be discussed. As an example of learning a source address, an MAC (Media Access control) address of an Ethernet packet is assumed to be learned.

FIG. 8 is a diagram illustrating an example of a data structure of an internal transfer packet according to a first embodiment of the present invention. In the example illustrated in FIG. 8, an internal transfer packet consists of an internal transfer header 102, an MAC header 104, and a payload 106. An Ethernet packet consists of the MAC header 104 and the payload 106. The internal transfer header 102 is added thereto when transferred in the packet relay device 1. A source MAC address contained in the MAC header 104 and the data on the communication port via which the Ethernet packet is received are used to learn the MAC address. Accordingly, in the concrete example, it is assumed that at least the card ID and the port ID of the input port are contained in the internal transfer header 102. Since the source MAC address is included in the MAC header 104, the source MAC address is necessarily contained in the internal transfer header 102, but may be contained in the internal transfer header 102.

FIG. 9 is a diagram illustrating an example of a record structure of a port group table according to a first embodiment of the present invention. The port group table consists of a plurality of port group records illustrated in FIG. 9. One port group record contains a card ID 112, a port ID 114, a T flag 116, a trunk ID 118, and a cloud ID 120. In the concrete example, two types of port group are assumed.

A first port group is related to link aggregation. The link aggregation is a technique that handles a plurality of lines just like one line in order to increase the band of the line. By employing the link aggregation, the data received and transmitted via the plurality of communication ports may be handled as if the data is virtually received and transmitted via one virtual communication port. The virtual communication port is referred to as a trunk. The trunk ID 118 is capable of identifying the trunk. In the concrete example, one communication port is identified by the card ID 112 and the port ID 114. When the link aggregation is valid, communication ports having the same trunk ID 118 are handled as a one virtual communication port. When the link aggregation is invalid, each communication port is handled as an independent communication port. The T flag 116 is a flag capable of indicating whether the link aggregation is valid or invalid. In the concrete example, it is assumed that a packet is not be relayed between the communication ports having the same valid trunk ID 118. That is, a packet is not relayed between the communication ports which have the same trunk ID 118 and in which the T flag 116 is respectively set.

A second port group is related to a cloud. The cloud denotes networks mutually connected. When one cloud is connected to a plurality of communication ports in the same packet relay device 1, it is not necessary to relay a packet between the communication ports. The cloud ID 120 is capable of identifying the cloud. An invalid value, for example, every bit is "0", preliminarily determined for the cloud ID 120, means that the corresponding communication port is not connected to a common cloud with another communication port. In the concrete example, it is assumed that a packet is not relayed between communication ports having the same cloud ID 120 except the invalid value.

Figure 10:
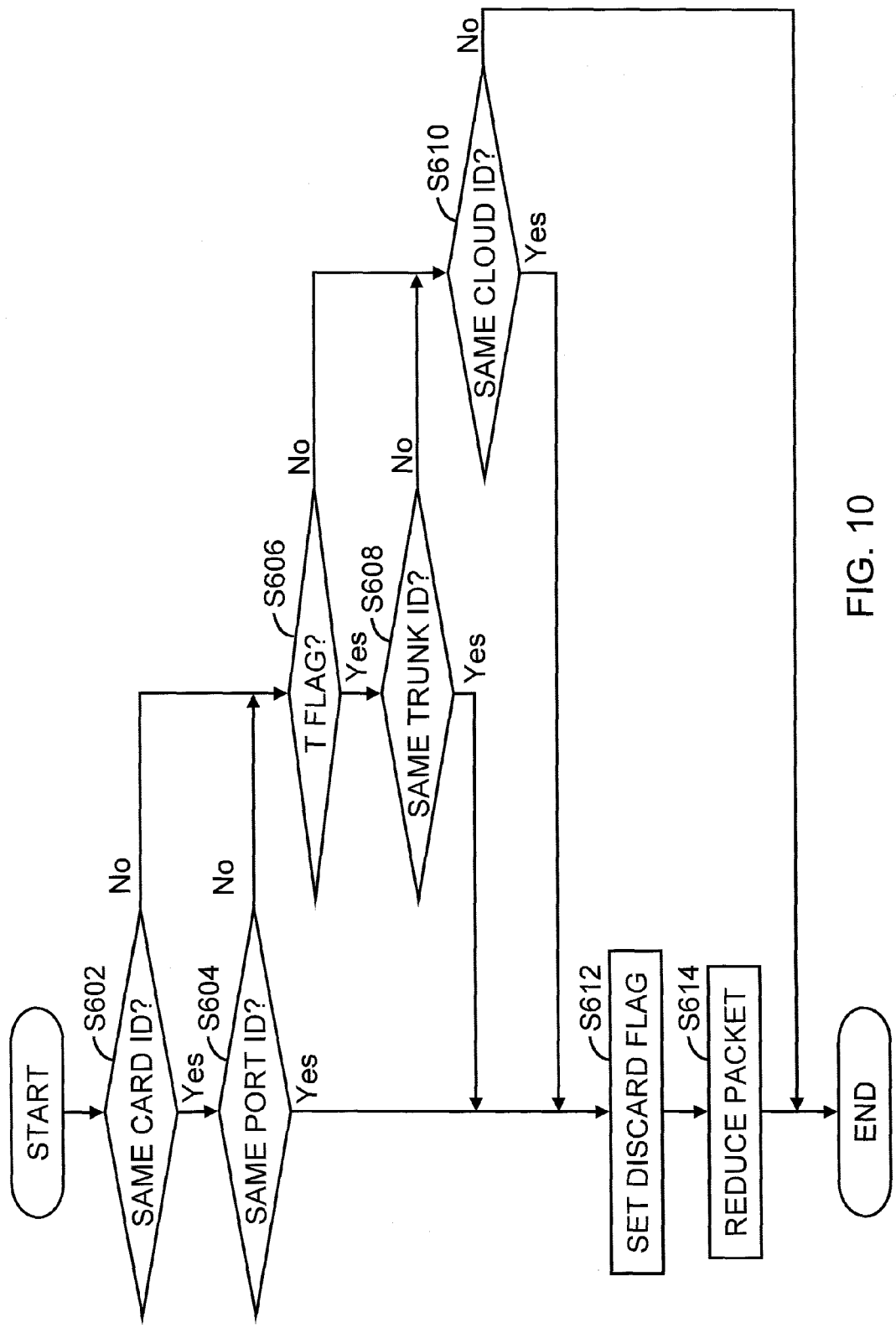
FIG. 10 is a flow chart illustrating an example of an operation flow of a packet reduction process according to a first embodiment of the present invention.

FIG. 10 is a flow chart illustrating an example of an operation flow of a packet reduction process according to a first embodiment of the present invention. The operation flow of the packet reduction process in the concrete example will be discussed in the order of operation S602 to operation S614.

In operation S602, the discard determiner 40 determines whether the input card ID and the output card ID are matched in accordance with the data contained in the internal transfer header.

In operation S604, when the card IDs 112 are matched ("Yes" in operation S602), the discard determiner 40 determines whether the input port ID and the output port ID are matched in accordance with the data contained in the internal transfer header.

In operation S606, when the card IDs 112 are not matched ("No" in operation S602), or when the port IDs 114 are not matched ("No" in operation S604), that is, when the input port and the output port are not the same port, the discard determiner 40 determines whether both of the T flags 116 of the input port and the output port are set in accordance with the data stored in the port group table storage 38.

In operation S608, when both of the T flags 116 of the input port and the output port are set ("Yes" in operation S606), the discard determiner 40 determines whether the trunk IDs 118 of the input port and the output port are matched.

In operation S610, when any of the T flags 116 of the input port and the output port is not set ("No" in operation S606), or when the trunk IDs are not matched ("No" in operation S608), the discard determiner 40 determines whether the cloud IDs 120 of the input port and the output port are matched except the invalid value, in accordance with the data stored in the port group table storage 38. When the cloud IDs 120 are not matched ("No" in operation S610), the discard determiner 40 determines that the internal transfer packet is not to be discarded and terminates the process.

In operation S612, when the port IDs 114 are matched ("Yes" in operation S604), or when the trunk IDs 118 are matched ("Yes" in operation S608), or when the cloud IDs 120 are matched except the invalid value ("Yes" in operation S610), the discard determiner 40 determines that the internal transfer packet is to be discarded and sets the discard flag contained in the internal transfer header.

In operation S614, the packet reducer 42 checks the discard flag contained in the internal transfer header, and performs the packet reduction process on the internal transfer packet when the discard flag is set. As a packet reduction method for the internal transfer packet, in the concrete example, it is assumed that the payload 106 is removed from the internal transfer packet illustrated in FIG. 8, and only the internal transfer header 102 and the MAC header 104 are preserved. The packet reduction method for the internal transfer packet is not limited to this and any method may be employed as far as the data required for learning the source address is preserved in the internal transfer packet after the packet reduction process.

Second Embodiment

Figure 11:
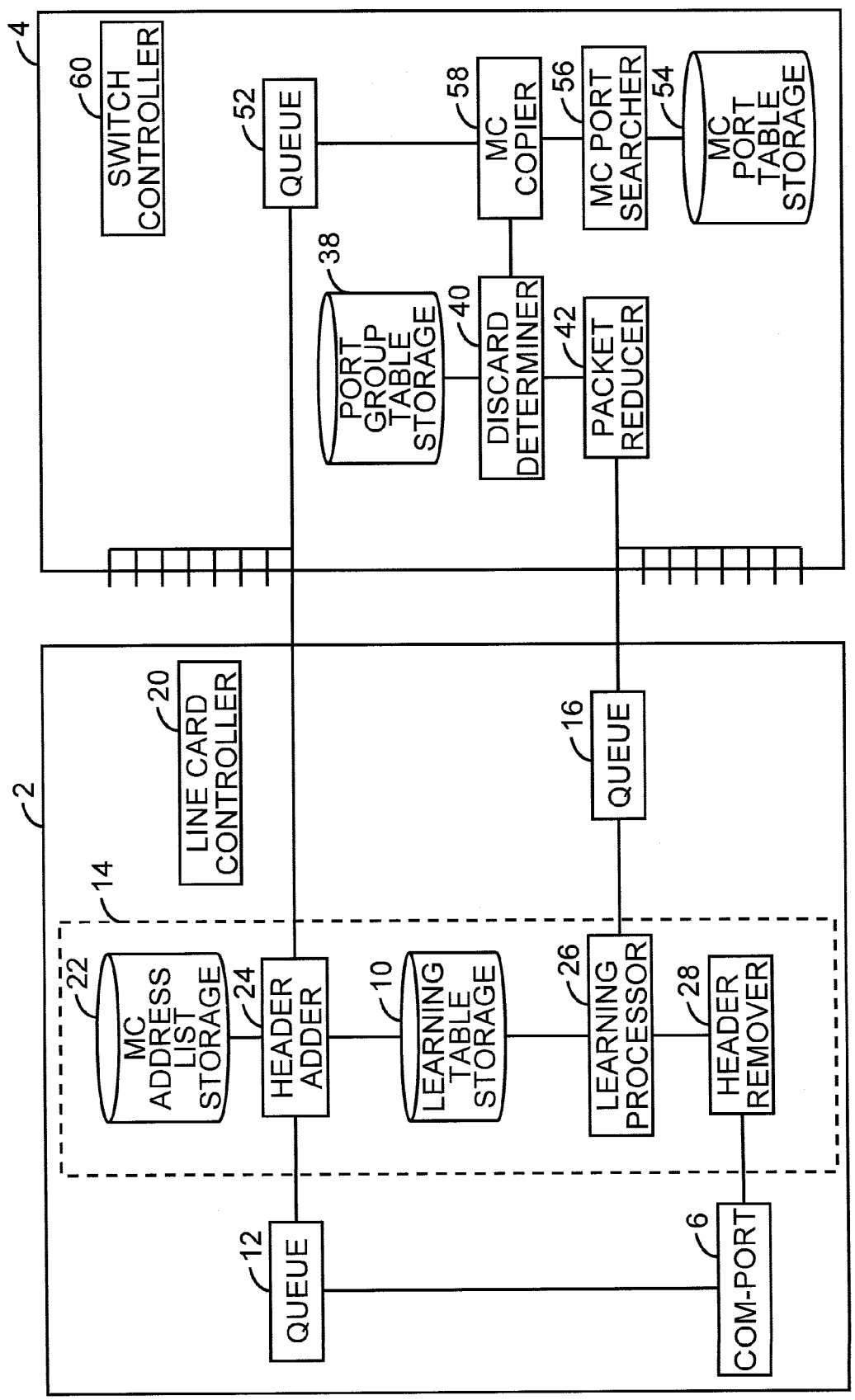
FIG. 11 is a diagram illustrating an example of a detailed configuration of a packet relay device according to a second embodiment of the present invention.

FIG. 11 is a diagram illustrating an example of a detailed configuration of a packet relay device according to a second embodiment of the present invention. In FIG. 11, like reference numeral denotes like element as that in FIG. 2. In the second embodiment, it is assumed that each line card 2 has one communication port 6. The characteristic of the second embodiment is that it is not necessary that the communication port 6 is mounted in the independent line card 2 one by one, and the learning process is performed for every communication port 6. Since the multicast copy is not performed on the line card 2 in the second embodiment, the determination of discarding the internal transfer packet and the packet reduction on the internal transfer packet may be performed on the switch card 4 after the multicast copy is performed. Accordingly, it becomes possible to control traffic increase at the point when transferred from the switch card 4 to each line card 2.

Third Embodiment

Figure 12:
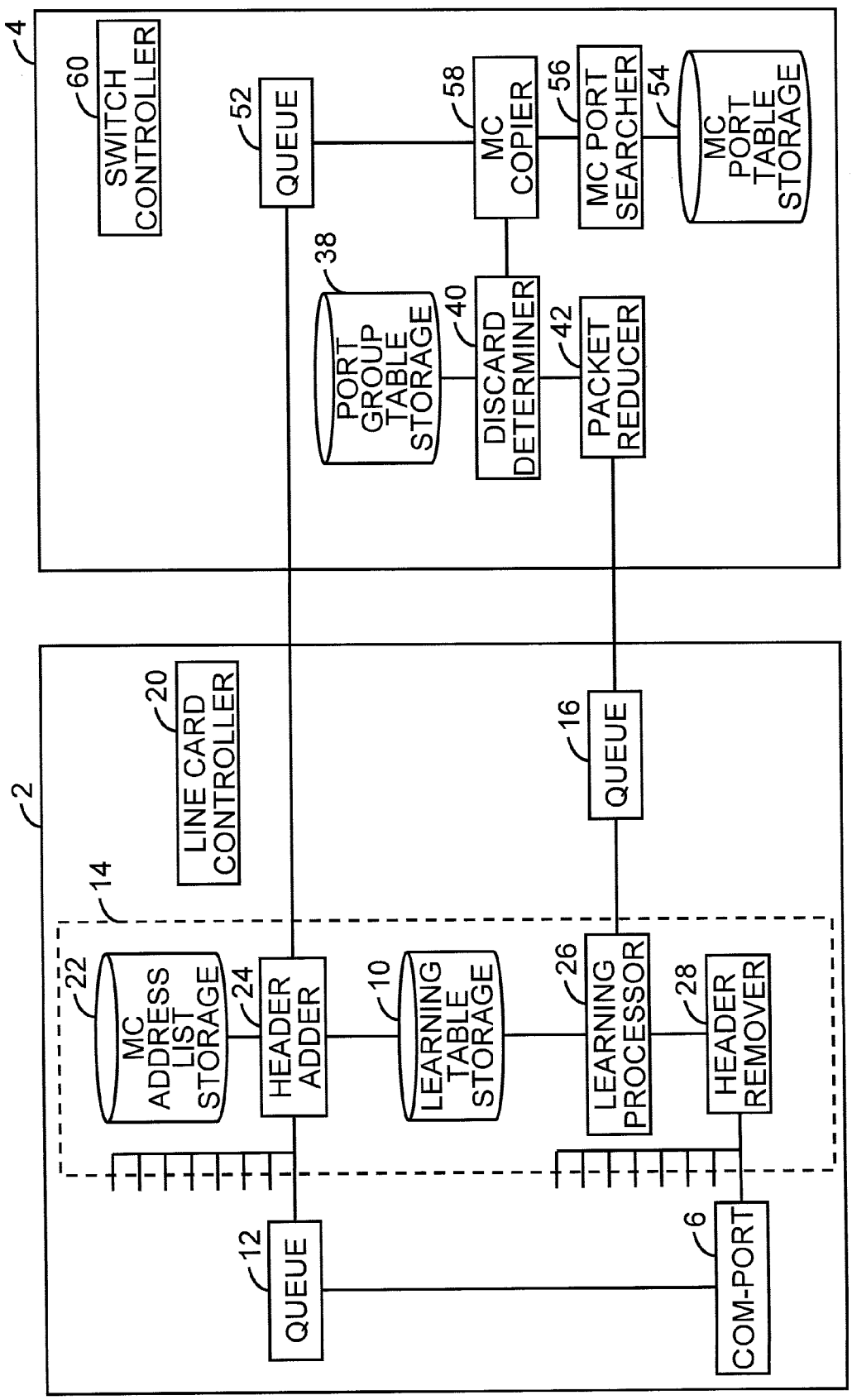
FIG. 12 is a diagram illustrating an example of a detailed configuration of a packet relay device according to a third embodiment of the present invention.

FIG. 12 is a diagram illustrating an example of a detailed configuration of a packet relay device according to a third embodiment of the present invention. In FIG. 12, like reference numeral denotes like element as that in FIG. 2. In the third embodiment, it is assumed that the packet relay device 1 has one line card 2 and all of the communication ports 6 are mounted in the one line card 2, and that only one learning processor 26 is mounted in the entire packet relay device 1. Since the multicast copy is not performed on the line card 2 in the third embodiment, the determination of discarding the internal transfer packet and the packet reduction on the internal transfer packet may be performed on the switch card 4 after the multicast copy is performed. Accordingly, it becomes possible to control traffic increase at the point when transferred from the switch card 4 to each line card 2.

As discussed above, according to the embodiments, the determination of discarding the internal transfer packet is performed after the multicast copy, and when it is determined that the internal transfer packet is discarded, the internal transfer packet is transferred to the learning processor after the packet reduction process is performed on the internal transfer packet. Accordingly, a method for transferring a discard packet in a packet relay device, which makes it possible to control traffic increase caused by transferring the discard packet, may be provided.

Note that the functions of the packet relay device according to the above-discussed embodiments may be provided not only as hardware, but also as software of a computer embedded in the packet relay device. For example, the functions of the multicast copier 18 may be provided by creating a program causing a computer to execute the functions of the MC port searcher 34, the MC copier 36, the discard determiner 40, and the packet reducer 42 illustrated in FIG. 2, and by causing the computer to read the program in a memory thereof and execute the program.

The program that causes a computer to operate as the packet relay device according to the embodiments of the invention may be stored in any of a ROM or a RAM mounted in the computer, or a recording medium such as a hard disc. The program is loaded and executed in a main memory when the program is executed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A packet relay device for receiving an input packet via a first communication port out of a plurality of communication ports of the packet relay device and transmitting the input packet via a second communication port out of the plurality of communication ports, said packet relay device comprising:
    a learning table storage for storing a source address contained in the input packet, in association with an input port identifier capable of identifying the first communication port;
    a header adder for adding an internal transfer header containing the input port identifier to the input packet to generate an internal transfer packet;
    a discard determiner for determining whether to discard the internal transfer packet; and
    a packet reducer for reducing the internal transfer packet to preserve at least the source address and the input port identifier upon determining to discard the internal transfer packet.

2. The packet relay device of claim 1, wherein said input packet is an Ethernet packet containing an MAC header and a payload, and said source address is an MAC address.

3. The packet relay device of claim 2, wherein said packet reducer removes a part of the payload from the internal transfer packet to reduce the internal transfer packet.

4. A method for transferring an internal transfer packet within a packet relay device for receiving an input packet via a first communication port out of a plurality of communication ports of the packet relay device and transmitting the input packet via a second communication port out of the plurality of communication ports, said method being executed by the packet relay device, said method comprising:
    storing a source address contained in the input packet, in association with an input port identifier capable of identifying the first communication port;
    adding an internal transfer header containing the input port identifier to the input packet to generate the internal transfer packet;
    determining whether to discard the internal transfer packet; and
    reducing the internal transfer packet to preserve at least the source address and the input port identifier upon determining to discard the internal transfer packet.

5. The method of claim 4, wherein said input packet is an Ethernet packet containing an MAC header and a payload, and said source address is an MAC address.

6. The method of claim 5, wherein a part of the payload is removed from the internal transfer packet to reduce the internal transfer packet in the operation of reducing the internal transfer packet.

7. A non-transitory computer-readable medium storing a program comprising computer-executable instructions enabling a computer to execute a method for transferring an internal transfer packet within the computer, said computer receiving an input packet via a first communication port out of a plurality of communication ports of the computer and transmitting the input packet via a second communication port out of the plurality of communication ports, said method including:
    storing a source address contained in the input packet, in association with an input port identifier capable of identifying the first communication port,
    adding an internal transfer header containing the input port identifier to the input packet to generate the internal transfer packet,
    determining whether to discard the internal transfer packet, and
    reducing the internal transfer packet to preserve at least the source address and the input port identifier upon determining to discard the internal transfer packet.

8. The non-transitory computer-readable medium of claim 7, wherein said input packet is an Ethernet packet containing an MAC header and a payload, and said source address is an MAC address.

9. The non-transitory computer-readable medium of claim 8, wherein a part of the payload is removed from the internal transfer packet to reduce the internal transfer packet in the operation of reducing the internal transfer packet.

* * * * *